United States Patent [19]
Epstein

[11] Patent Number: 6,023,927
[45] Date of Patent: Feb. 15, 2000

[54] SHACKLE WITH A KANT LOOSE PIN

[76] Inventor: Irving Epstein, 4216 Shoreclub Dr., Mercer Island, Wash. 98040

[21] Appl. No.: 09/104,619

[22] Filed: Jun. 25, 1998

[51] Int. Cl.$^7$ .................................................... F16G 15/04
[52] U.S. Cl. ..................................................... 59/86; 59/85
[58] Field of Search ........................................... 59/85, 86

[56] References Cited

U.S. PATENT DOCUMENTS

| | | |
|---|---|---|
| 140,715 | 7/1873 | Lahman . |
| 199,073 | 1/1878 | Kinney . |
| 427,482 | 5/1890 | Ruck . |
| 543,087 | 7/1895 | Ferris . |
| 897,347 | 9/1908 | Buckius . |
| 923,767 | 6/1909 | Buckius . |
| 1,287,869 | 12/1918 | Buckius . |
| 1,368,117 | 2/1921 | Claude . |
| 1,419,974 | 6/1922 | McLaughlin . |
| 1,646,546 | 10/1927 | Larsen . |
| 1,762,113 | 6/1930 | Achatz .......................................... 59/86 |
| 4,896,989 | 1/1990 | Swager ......................................... 59/86 |
| 5,046,881 | 9/1991 | Swager ......................................... 59/86 |

FOREIGN PATENT DOCUMENTS 281556  12/1927  United Kingdom ........................ 59/86

*Primary Examiner*—David Jones

[57] ABSTRACT

A shacke and clevis pin are provided whereby the shackle and clevis pin cannot be separated from each other. It is possible to attach a cable or a chain or a rope to the shackle. It is also possible to attach a cable or a rope or a chain to the clevis pin. The clevis pin and the shackle join to ropes and/or cables and/or chains together. There is a provision for precluding the clevis pin from being withdrawn, completely, from the shackle. Also, there is provision with the shackle and clevis pin so that one operator can connect a cable or cables to the shackle and clevis pin thereby eliminating two operators in operating the shackle and clevis pin. The spring urges a locking lever to lock the clevis pin and shackle together and to preclude the rotation of the clevis pin and shackle with respect to each other.

16 Claims, 14 Drawing Sheets

SHACKLE WITH A KANT LOOSE PIN

CROSS-REFERENCES TO RELATED PATENT APPLICATIONS (if any)

There is no related application.

STATEMENT REGARDING FEDERALLY SPONSORED RESEARCH AND DEVELOPMENT

There is no federally sponsored research and development fund associated with this invention.

REFERENCE TO A "MICROFICHE APPENDIX"

There is no microfiche appendix. This section is not applicable to this patent application.

BACKGROUND OF THE INVENTION

1. Field of the Invention

The field of the invention is joining together two objects such as two chains; two cables; two ropes; a chain and a cable; or a chain and a rope, for example. Further, the subject matter may be used for joining a draw bar and/or a chain and/or a cable and/or a rope.

In many areas of construction and/or in a logging operation and/or at a sea port, it is often necessary to join two chains or two cables or two ropes. A shackle is often used for this purpose. A first chain, for example, can be positioned on the shackle and a second chain, for example can be positioned on the clevis pin in the shackle.

2. Description of the Related Art

In some shackles there is used a bolt having on a first end a head and having on a second end threads. A nut is positioned on the threaded end. The bolt can be attached to the shackle and the nut threaded on the end of the bolt. This is a frequently used type of shackle and bolt and nut combination. Unfortunately, many times a person using such a shackle forgets to, after using the shackle, insert the bolt into the shackle and place the nut on the threaded end of the bolt. As a result, another person wanting to use the shackle cannot use the shackle until there is secured a bolt and a nut for use with the shackle.

A patent search was made before the preparation of this patent application. In the search there was found the following interesting patents. These are listed by name, patent number, and issue date.

| NAME | PATENT NUMBER | ISSUE DATE |
| --- | --- | --- |
| W. LAHMAN | 140,715 | JULY 8, 1873 |
| W. KINNEY | 199,073 | JANUARY 8, 1878 |
| R. M. RUCK | 427,482 | MAY 6, 1890 |
| H. L. FERRIS | 543,087 | JULY 23, 1895 |
| A. O. BUCKIUS | 897,347 | SEPTEMBER 1, 1908 |
| A. O. BUCKIUS | 923,767 | JUNE 1, 1909 |
| A. O. BUCKIUS | 1,287,869 | DECEMBER 17, 1918 |
| G. E. CLAUDE | 1,368,117 | FEBRUARY 8, 1921 |
| J. MCLAUGHLIN | 1,419,974 | JUNE 20, 1922 |
| L. J. LARSEN | 1,646,546 | SEPTEMBER 18, 1926 |

The argument is advanced that the subject shackle and clevis pin define over the above listed patents in that the subject invention comprises a spring loaded locking lever to preclude rotation of the shackle and the clevis pin with respect to each other. With this preclusion of said rotation of the shackle and the clevis pin with respect to each other, the clevis pin cannot become detached from the shackle.

| NUMBER | DATE | TITLE |
| --- | --- | --- |
| 4,658,748 | APR. 21, 1987 | RELEASABLE HOOK |
| 4,611,842 | SEP. 16, 1986 | RELEASABLE HOOK |
| 3,761,122 | SEP. 25, 1973 | RELEASABLE HOOK |
| 3,762,757 | OCT. 02, 1973 | RELEASABLE HOOK |
| 3,827,513 | AUG. 06, 1974 | APPARATUS FOR MEASURING POWDER |
| 3,811,720 | MAY 21, 1974 | RELEASABLE HOOK |
| 4,572,565 | FEB. 25, 1986 | STOPPER FOR A WIRE ROPE |
| 3,407,778 | OCT. 29, 1968 | MARINE TOWING PLATE |
| 3,498,340 | MAR. 03, 1970 | METHOD AND AN APPARATUS FOR POSITIONING A WIRE ROPE |
| 4,389,907 | JUN. 28, 1983 | RELEASABLE HOOK |
| 4,034,992 | JUL. 12, 1977 | RELEASABLE HOOK |
| 5,190,435 | MAR. 02, 1993 | FORK LIFT TRUCK |
| 5,364,145 | NOV. 15, 1994 | SINGLE ACTION ROTARY RELEASE HOOK |
| CANADA | | |
| 1,114,586 | DEC. 22, 1981 | RELEASABLE HOOK |
| 843,162 | JUN. 02, 1970 | MARINE TOWING PLATE |
| 1,064,074 | OCT. 09, 1979 | RELEASABLE HOOK |
| GREAT BRITAIN | | |
| 1,556,070 | NOV. 21, 1979 | RELEASABLE HOOK ASSEMBLY. |

BRIEF SUMMARY OF THE INVENTION

There is provided a shackle and a clevis pin for operatively connecting two members such as two cables or connecting a draw bar and a cable or for connecting a double tree and a cable.

Most shackles use a bolt and a nut as a clevis pin. The nut is removed from the bolt and the bolt removed from the shackle. The bolt and the nut are often lost and it is necessary to find another bolt and another nut. This is a waste of time looking for the nut and bolt or another nut.

Further, to attach cable to the bolt may be difficult for one person. The cable must be positioned near the shackle while the operator is trying to position the bolt in both the shackle and the cable. This can be frustrating, and may be impossible, for one person to accomplish. Sometimes, two people are required to attach a nut and a bolt combination to a cable and a shackle.

The subject shackle and clevis pin are joined so that they do not separate into two units. In this manner, the shackle and the clevis pin do not separate and the clevis pin is not lost.

Also, one person can attach a cable to the clevis pin.

OBJECTS AND ADVANTAGES

An object and advantage of this invention is to provide a shackle and a clevis pin combination whereby the shackle and clevis pin are moveable with respect to each other but cannot be separated from each other;

Another object is to provide a shackle and clevis pin whereby one operator can attach cables to the shackle and clevis pin;

Another object is to provide an improved means for locking the clevis pin in its operative position with respect to the shackle;

Another object is to provide a spring actuated locking lever for locking said clevis pin in position in the shackle;

An additional object is to provide a guard to preclude extraneous material entering the spring; and Additional objects, advantages and novel features of the invention will be set forth in part in the description which follows, and in part will become apparent to those skilled in the art upon examination of the following or may be learned by the practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWING(S)

In the drawings, it is seen that:

Figure 8:
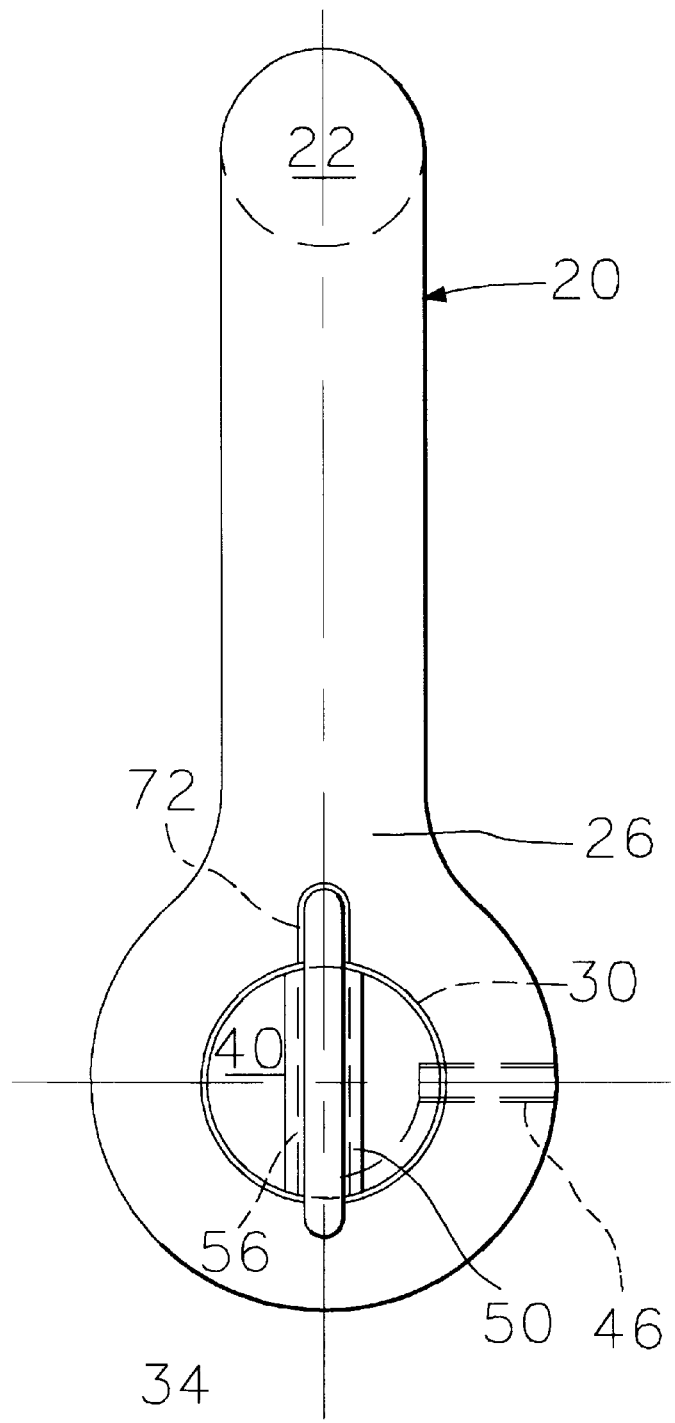
FIG. 8 is a side elevational view, with respect to FIG. 7, a right side elevational view, and illustrates the clevis pin in the passageways in the shackle and also illustrates the locking lever positioned in the recess in the exterior surface of the shackle so as to preclude rotation of the shackle and the clevis pin with respect to each other.
Figure 9:
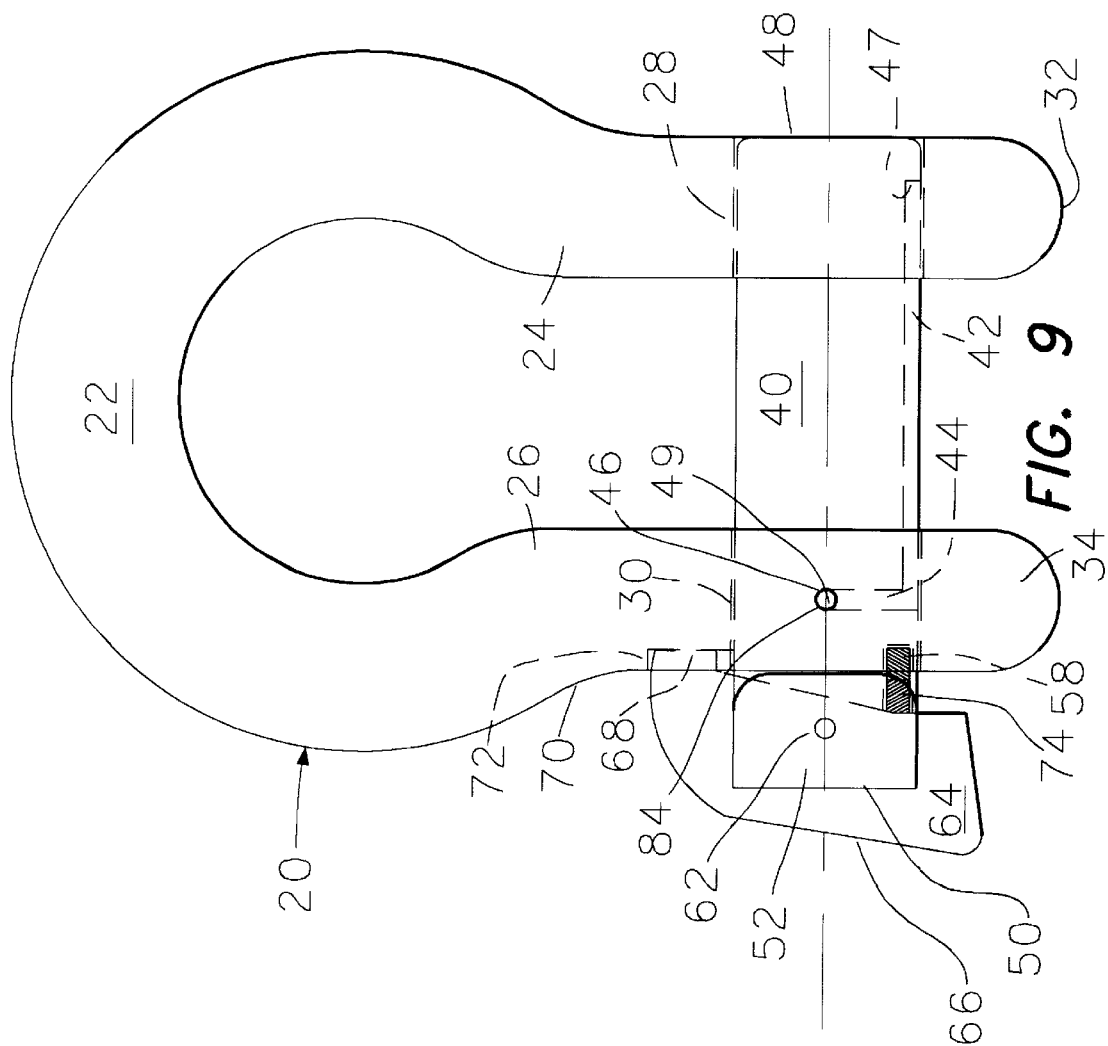
Figure 10:
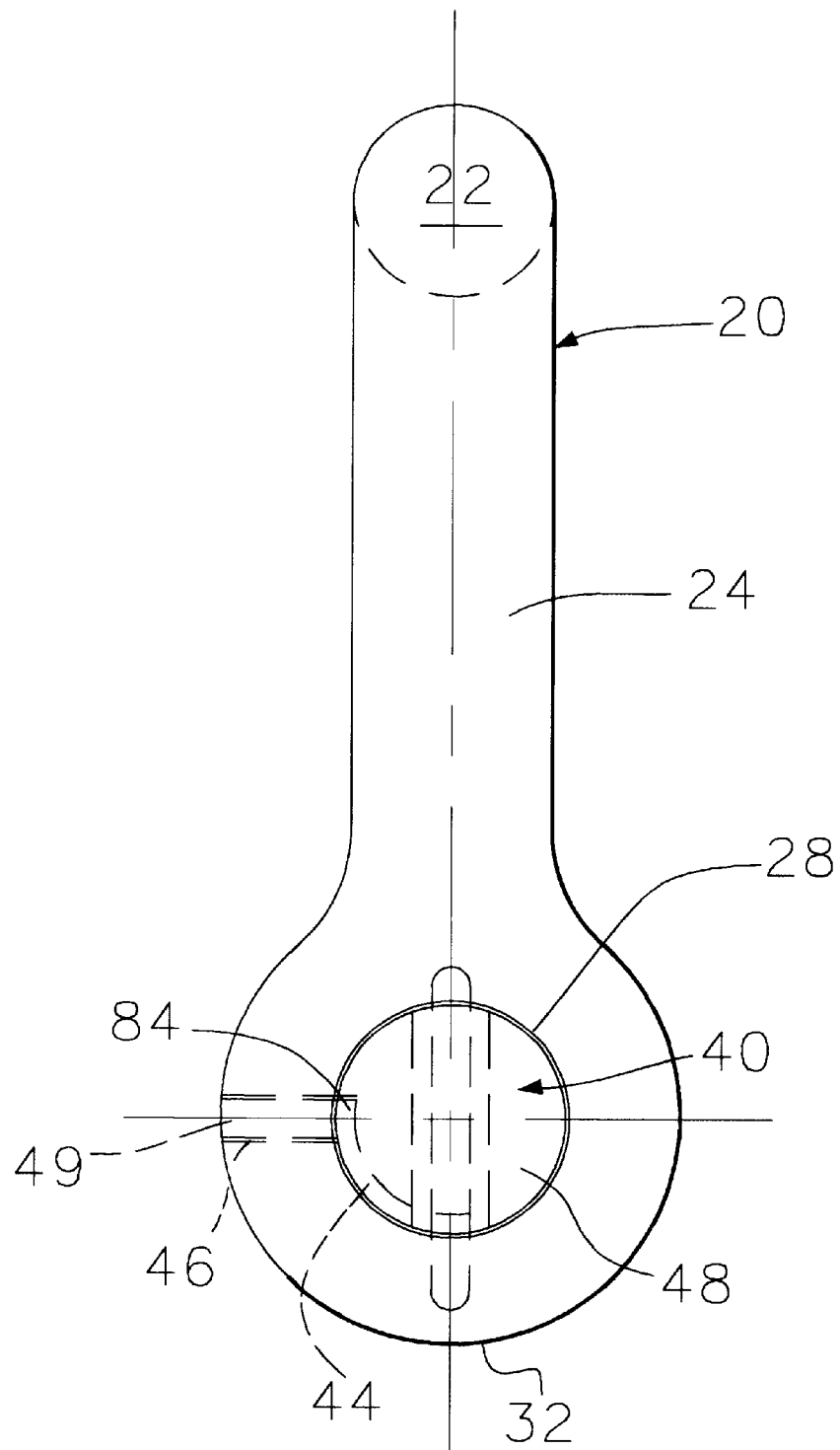
Figure 11:
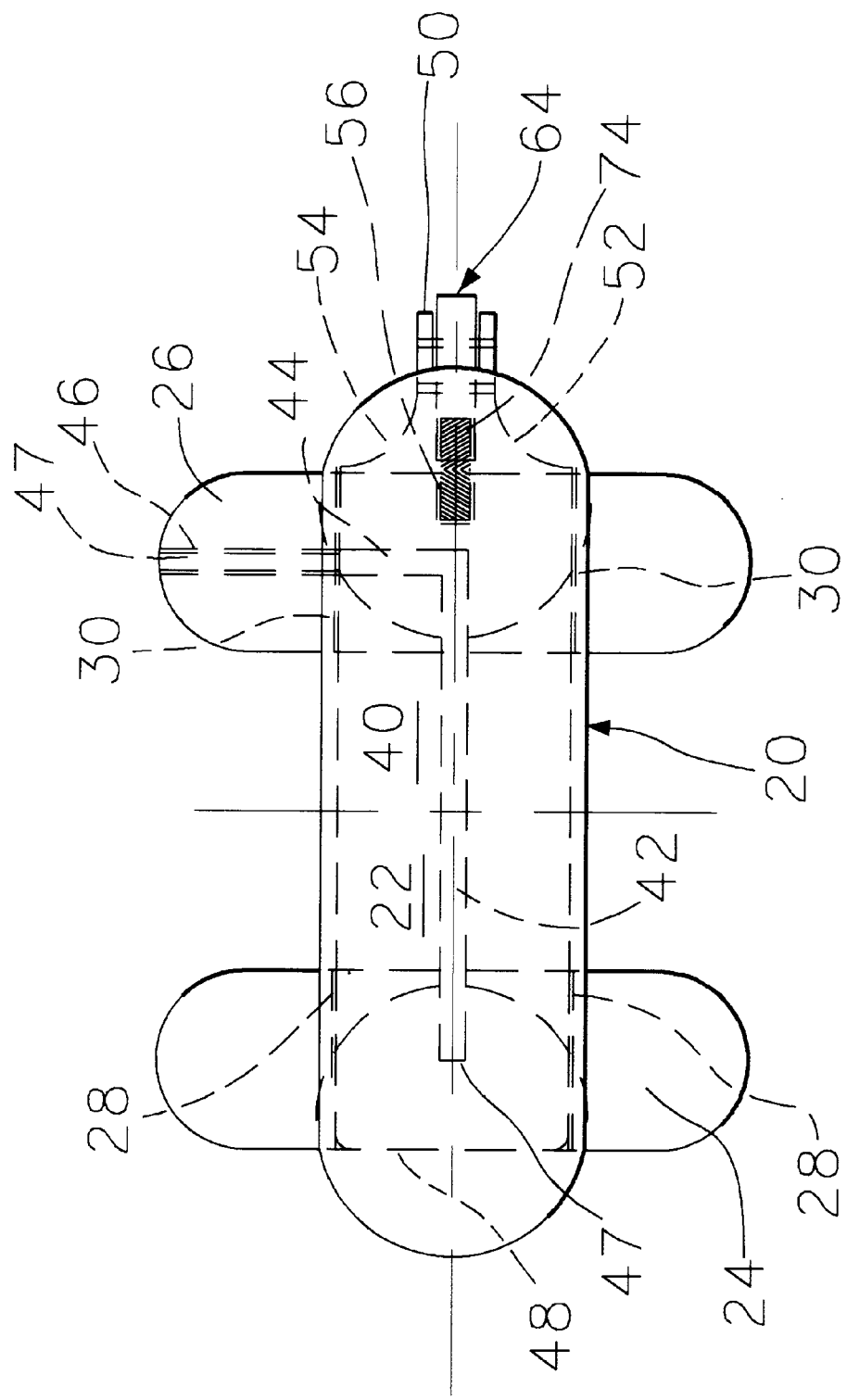
Figure 12:
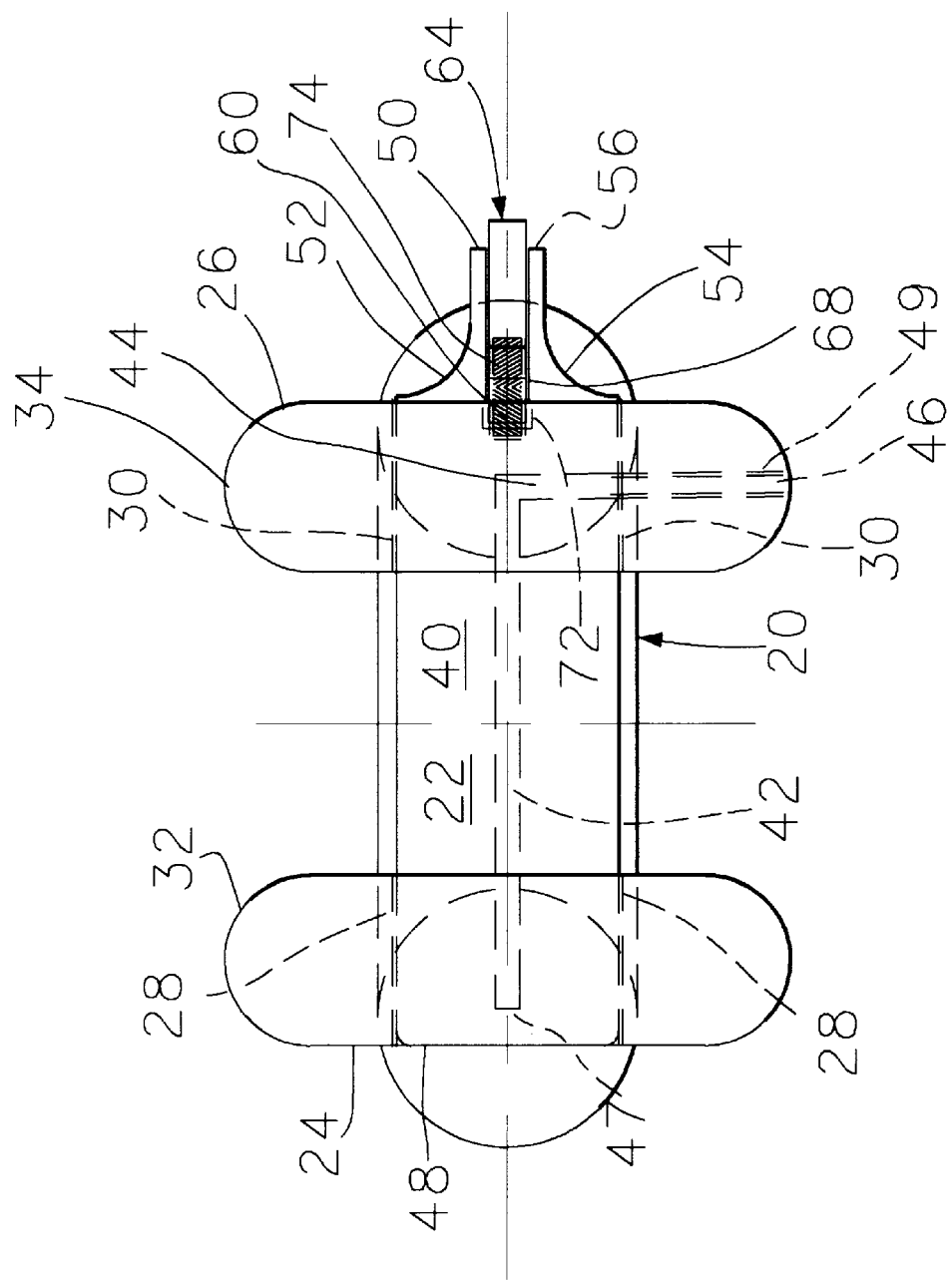

FIG. 9 is a rear elevational view of the combination of the shackle and the clevis pin with the clevis pin in the passageways in the shackle and also illustrates the circumferential groove in the clevis pin and a dowel pin in said circumferential groove and also illustrates part of a locking lever in the recess of the exterior surface of the shackle to prevent rotation of the shackle and the clevis pin with respect to each other and also illustrates a spring urging the locking lever to be in said recess;

FIG. 10 is a side elevational view opposite the side elevational view of FIG. 8 and illustrates the clevis pin being in the passageways in the shackle and also illustrates part of the locking lever being in the recess in the exterior surface of the shackle so as to preclude rotation of the shackle and the clevis pin with respect to each other;

FIG. 11 is a top plan view of the combination of the shackle and the clevis pin and illustrates the clevis pin in the passageways in the shackle and also illustrates the spring urging the locking lever toward the recess in the exterior surface of the shackle so as to preclude the rotation of the shackle and the clevis pin with respect to each other; and FIG. 12 is a bottom plan view of the combination of the shackle and the clevis pin and illustrates the clevis pin in the passageways in the shackle and also illustrates part of the locking lever in the recess of the exterior surface of the shackle to preclude the rotation of the shackle and the clevis pin with respect to each other.

Figure 13:
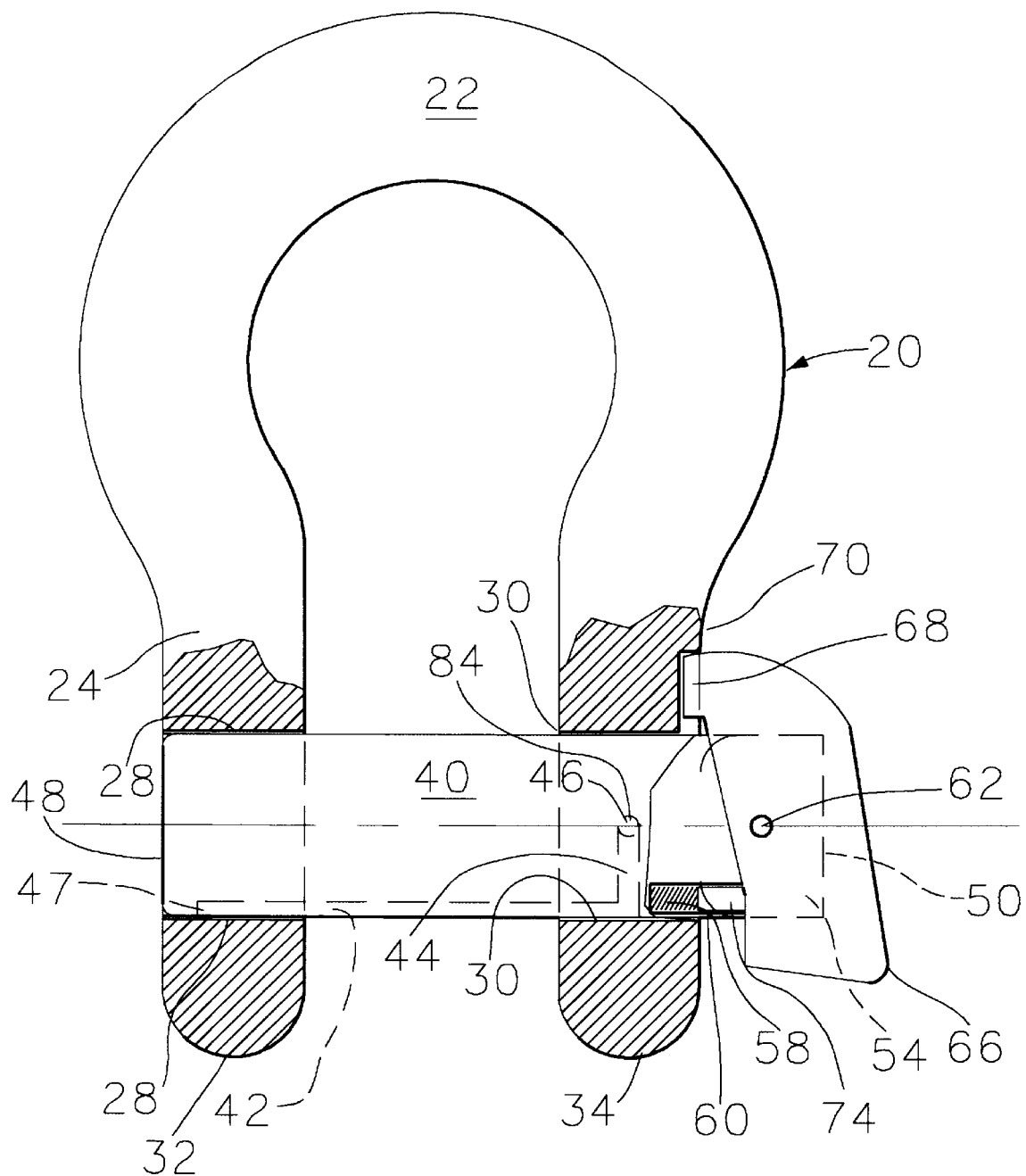
Figure 14:
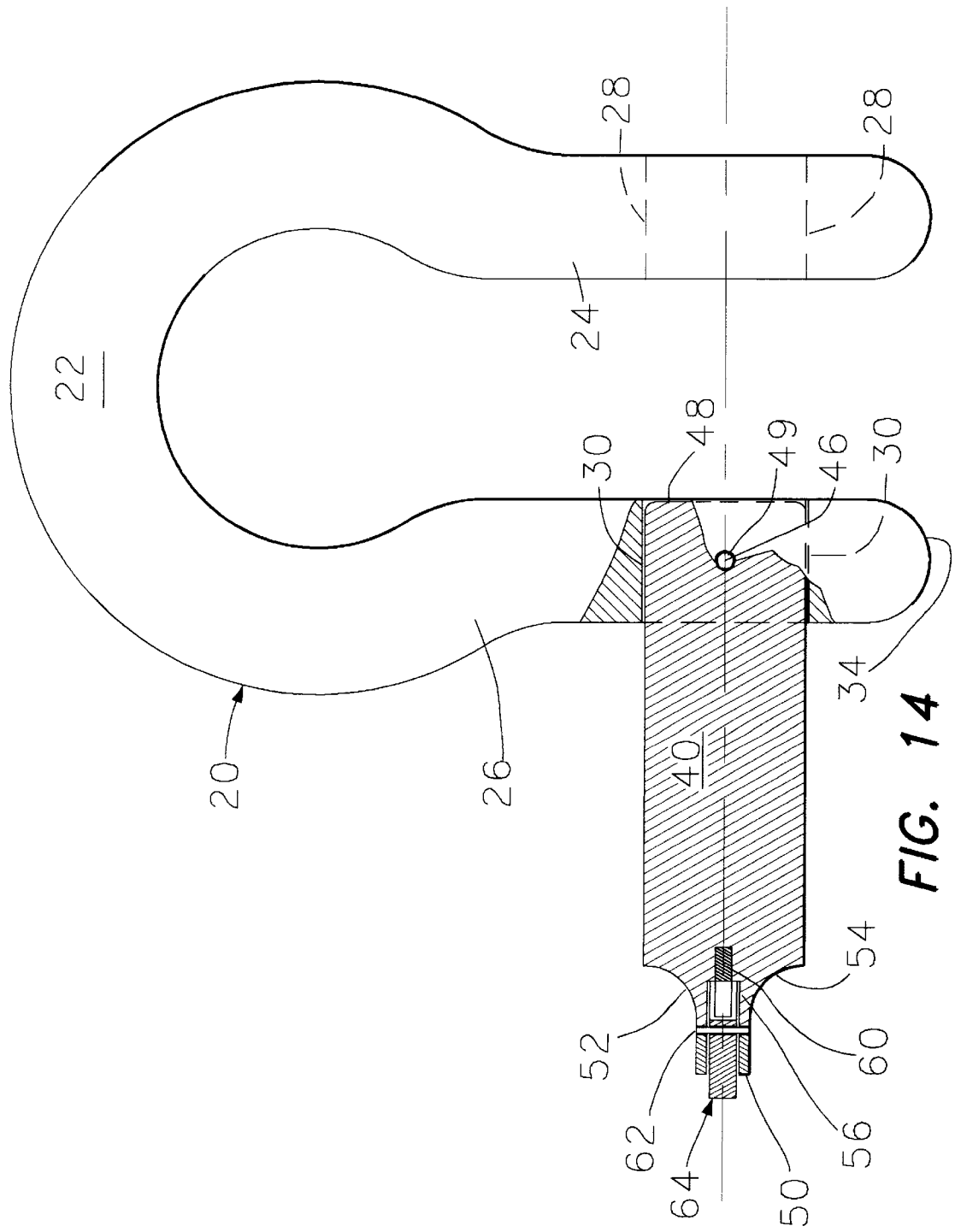

FIG. 13 is a front elevational view of the shackle and the clevis pin with part of the shackle in cross-section and with the clevis pin locked in position in the shackle; and, FIG. 14 is front elevational view of the shackle and the clevis pin with part of the shackle in cross-section and with the clevis pin in cross-section.

DETAILED DESCRIPTION OF THE INVENTION

Figure 1:
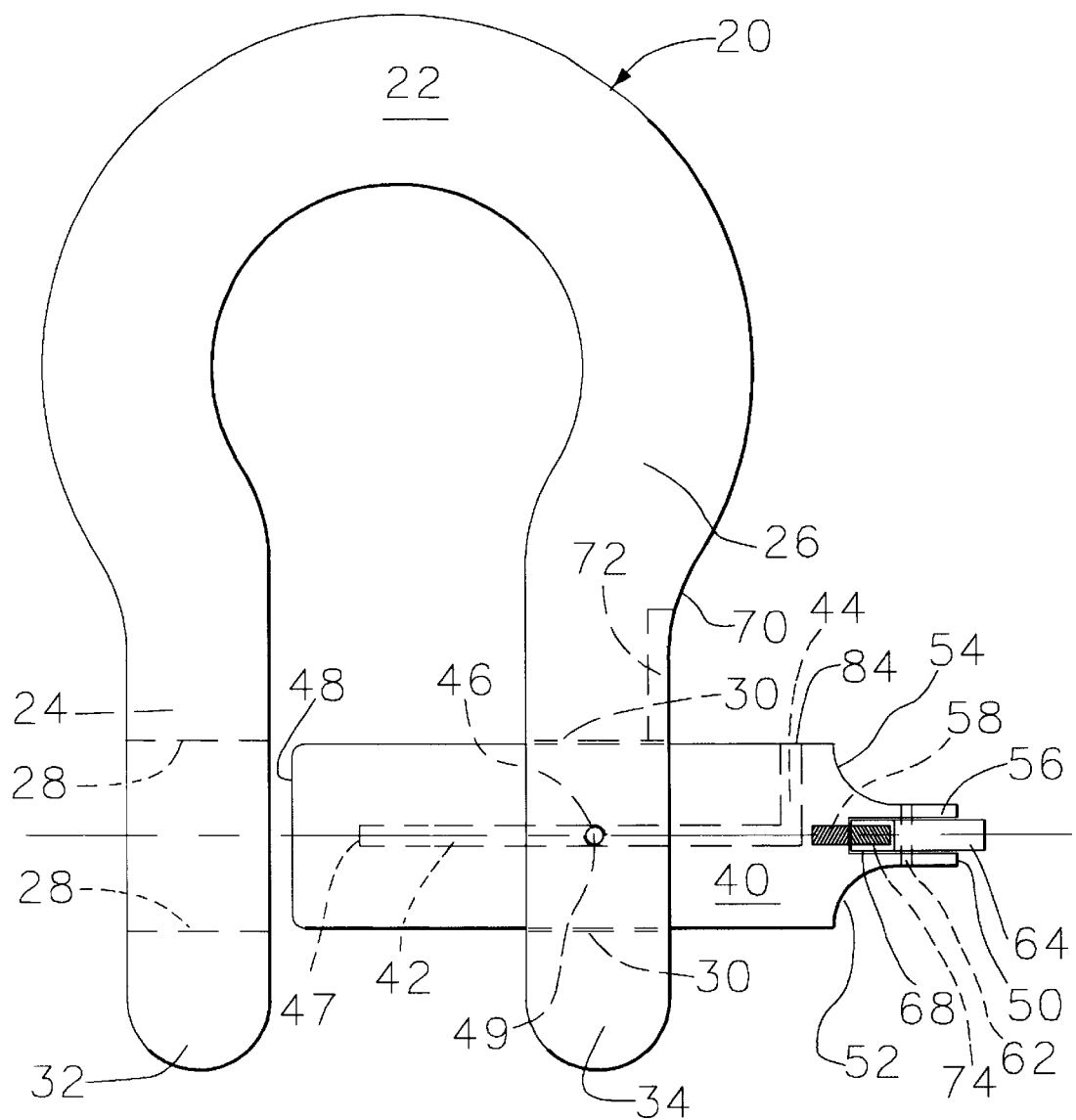
FIG. 1 is a front elevational view of the combination of a shackle and a clevis pin with the shackle comprising two legs which join together and passageways, denoted by broken lines, in the legs for receiving the clevis pin.
Figure 2:
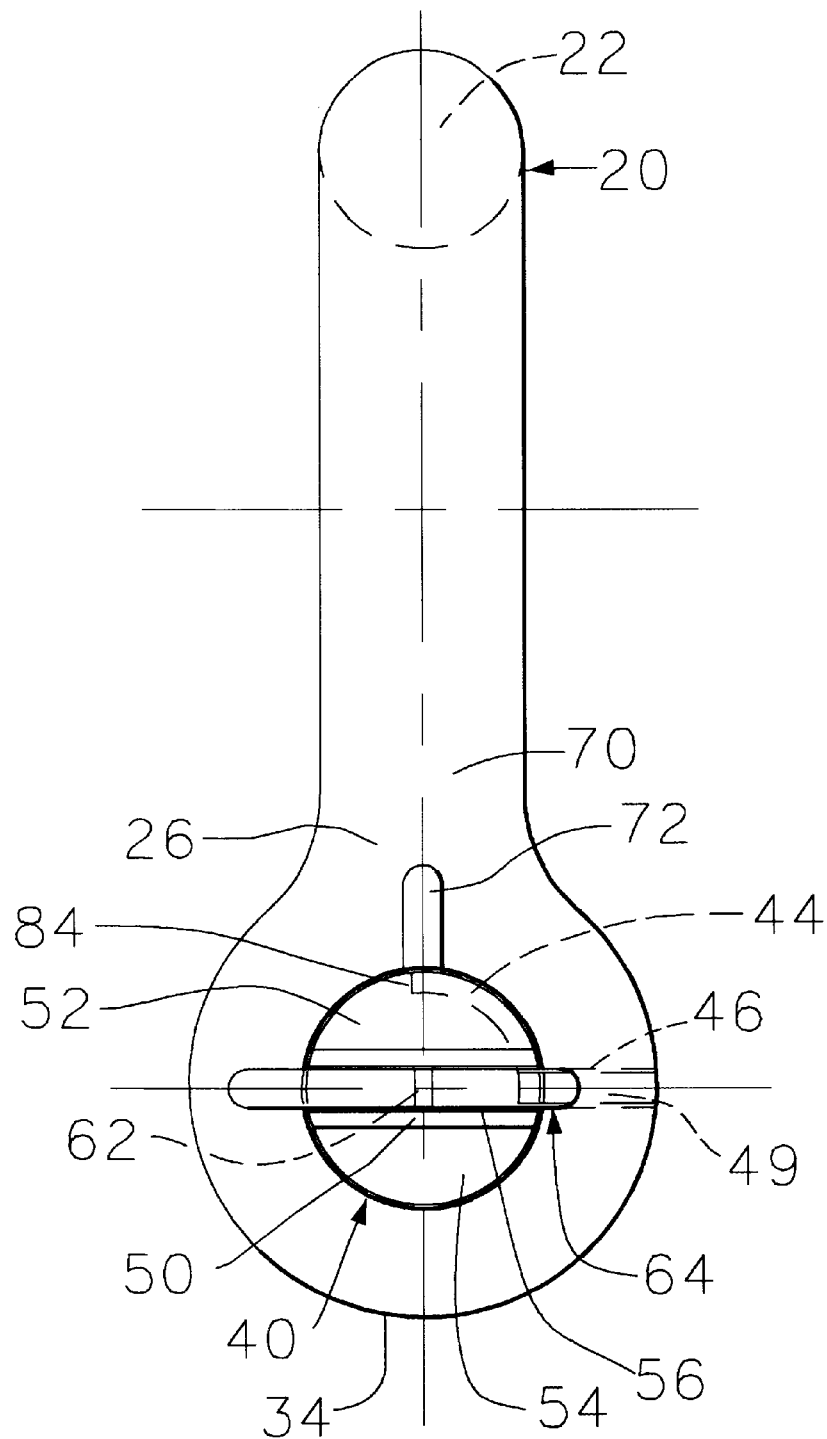
FIG. 2 is a side elevational view of the combination of the shackle and the clevis pin and with the clevis pin in a position so as not to be locked to the shackle.

With reference to the drawings it is seen that there is a shackle 20 comprising a first leg 24 and a second leg 26. The legs are spaced apart. In FIG. 1 it is seen that the shackle 20 is a generally U-configuration. Another way of describing the shackle is to state that the first leg 24 and the second leg 26 at their inner parts are joined by a connecting member 22.

In the first leg 24 near the first end 32 there is a first passageway 28. In the second leg 26 near the second end 34 there is a second passageway 30. The passageways 28 and 30 are aligned for receiving a clevis pin 40.

There is a clevis pin 40, in a cross-sectional view, of a generally circular configuration. The clevis pin 40 is longer than its diametrical dimension. In the exterior surface of the clevis pin 40, there is a groove 42 referred to as a longitudinal groove 42.

Near one end of the pin 40 there is a groove 44 connecting at a right angle with the groove 42. The groove 44 is referred to as a circumferential groove 44. The groove 44 leads from the groove 42 to the exterior surface and is generally of a length of about one quadrant or 90 degrees of the cross-sectional plane of the clevis pin 40.

In the second leg 26 and near the second passageway 30 there is a recess 49 for receiving a dowel pin 46 which projects into the groove 42 and/or the groove 44.

It is seen that the groove 42 stops at 47. The stop 47 is near the inner end 48 of the clevis pin 40. With the dowel pin 46 in the groove 42, it is not possible, because of the stop 47, to pull the clevis pin 40 out of the shackle 20. The clevis pin 40 can be pulled to the second passageway 30. This is the extent of the movement of the clevis pin 40 out of the first passageway 28 and the second passageway 30 in the shackle 20.

Reference 50 designates the other end of the clevis pin 40. It is seen that the outer end 50 is of a smaller dimension than the diameter of the clevis pin 40. The clevis pin 40 tapers inwardly at 52 and also tapers inwardly at 54 to form the outer end 50. Further, it is seen that there is a recess 56 in the outer end 50. Inwardly at the recess 56 there is a recess 58.

There is positioned in the recess 58 and also in the recess 56 a spring 60.

In the recess 56 there is an arbor 62. A locking lever 64 is positioned on the arbor 62 and rotates on the arbor 62.

The locking lever 64 is of a generally rectangular body 66 and on its upper end there is an outwardly projecting finger 68. The finger 68 projects toward the second leg 26.

In the exterior surface 70 of the second leg 26 there is a recess 72. The outwardly projecting finger 68 can be received in the recess 72, see FIG. 7. With the finger 68 in the recess 72, the clevis pin 40 cannot rotate. This means that the clevis pin 40 and the shackle 20 are in a fixed position with respect to each other and cannot rotate with respect to each other.

In FIG. 13 it is seen that there is a pin 74 which can move in recesses 56 and 58. The spring 60 urges the pin 74 against the locking lever 64. The spring 60 and the pin 74 assist in keeping the outwardly projecting finger 68 in the recess 72.

In certain operations such as logging and construction, the shackle and cables may get into dirt and bark and small pieces of material. These small pieces of material and the dirt are extraneous material and tend to work into the recesses 56 and 58 and into the spring 60. The recesses 56 and 58 are relatively small. This, coupled with the spring 60 and the pin 74 in the recesses 56 and 58 precludes dirt getting into the recesses 56 and 58.

Figure 7:
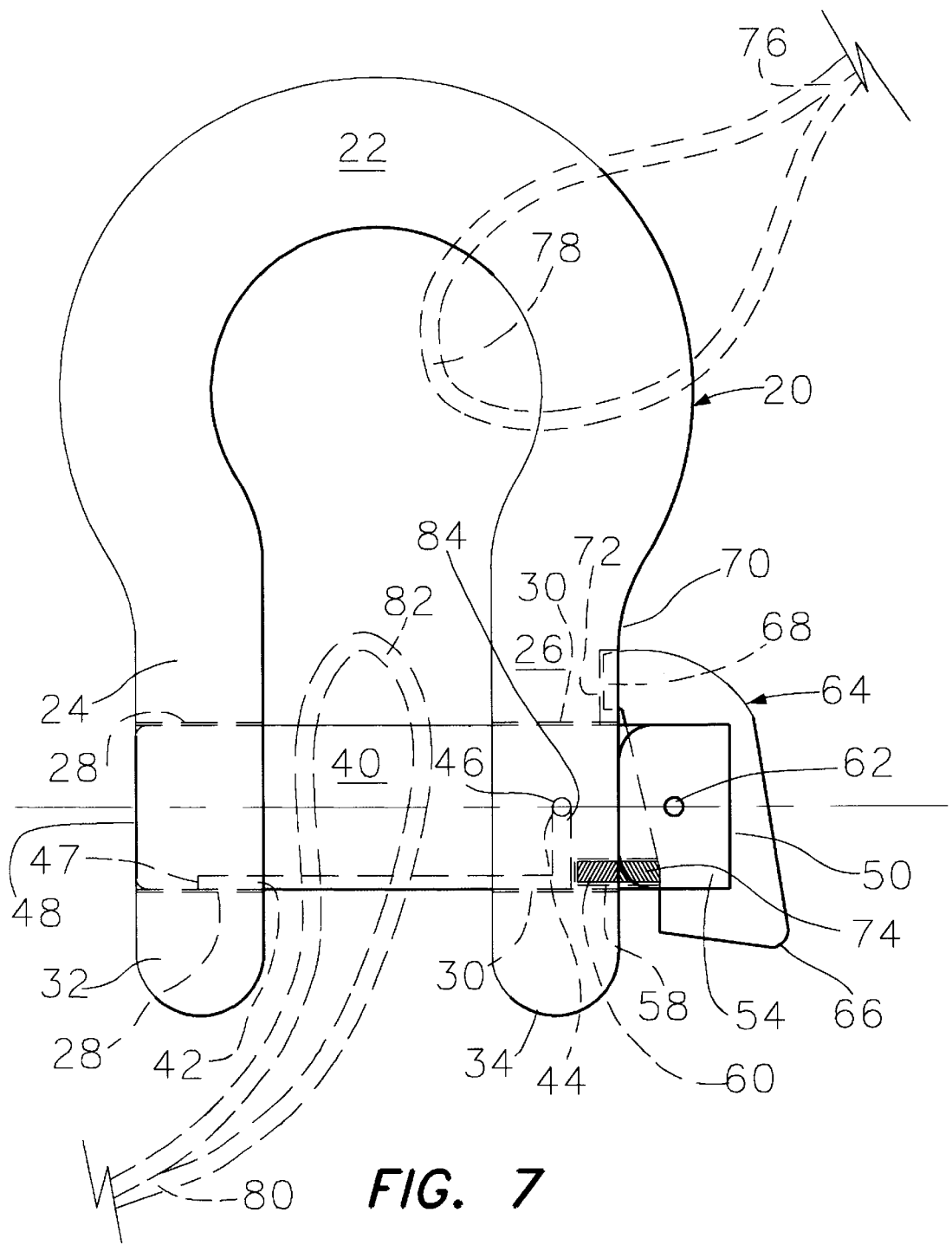
FIG. 7 is a front elevational view of the combination of the shackle and the clevis pin and with the clevis pin in the passageways in the shackle and also illustrates the spring urging part of the locking lever to be in a recess in the exterior surface of the shackle so as to preclude the rotation of the shackle and the clevis pin with respect to each other.

In regard to the operation of the shackle 20 and the clevis pin 40, reference is made to FIG. 7. It is seen that on the shackle 20 there is a cable 76 with a loop or eye 78. This loop or eye 78 encircles the shackle 20 and, in particular, the connecting member 22.

Assume that there is no cable or loop around the clevis pin 40. It is desired to connect a cable and a loop to the clevis pin 40.

Figure 3:
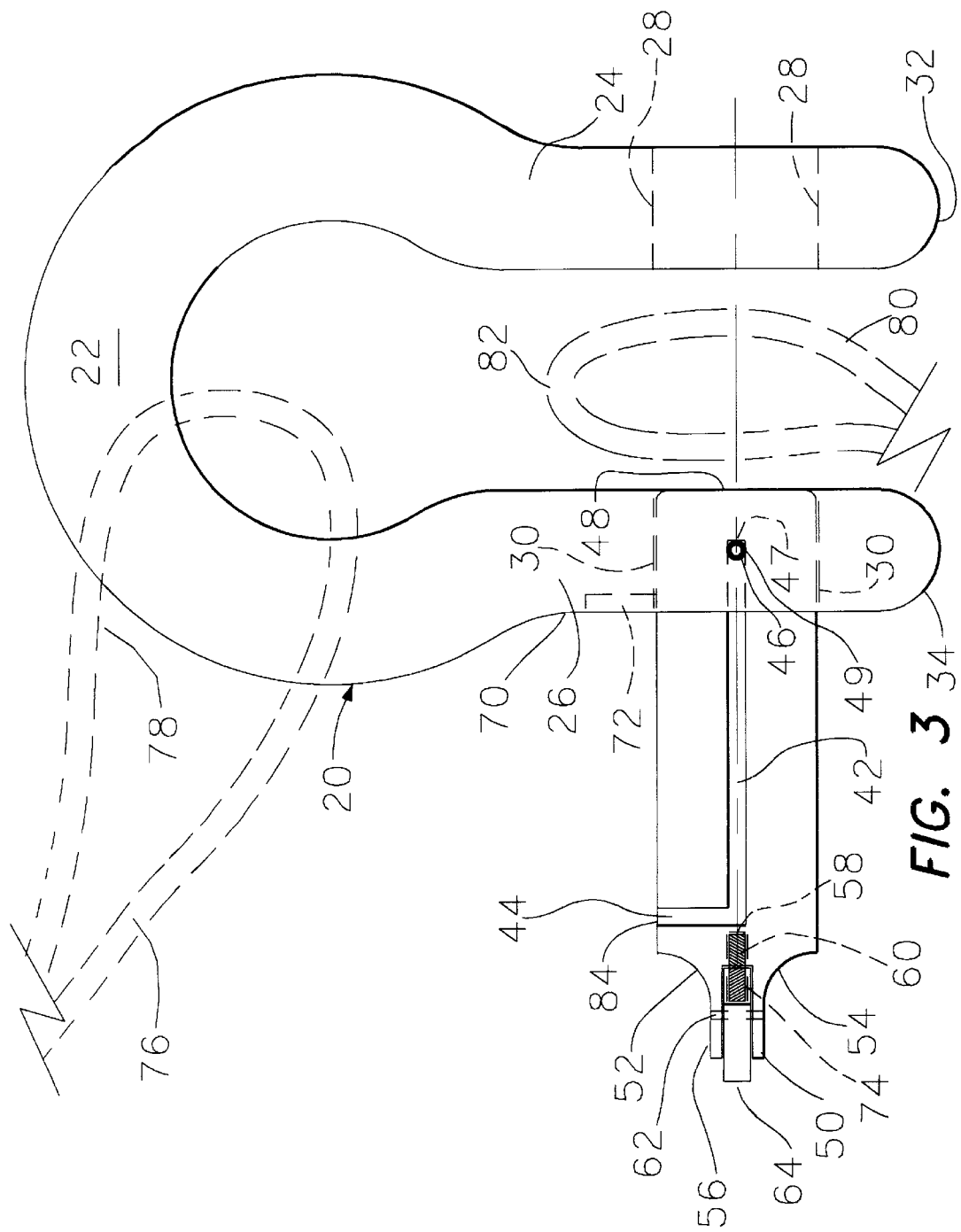
FIG. 3 is a rear elevational view of the combination of the shackle and the clevis pin and illustrates the clevis being restricted in movement so as not to be able to be removed from the shackle and also illustrates a spring bearing against the locking lever.
Figure 4:
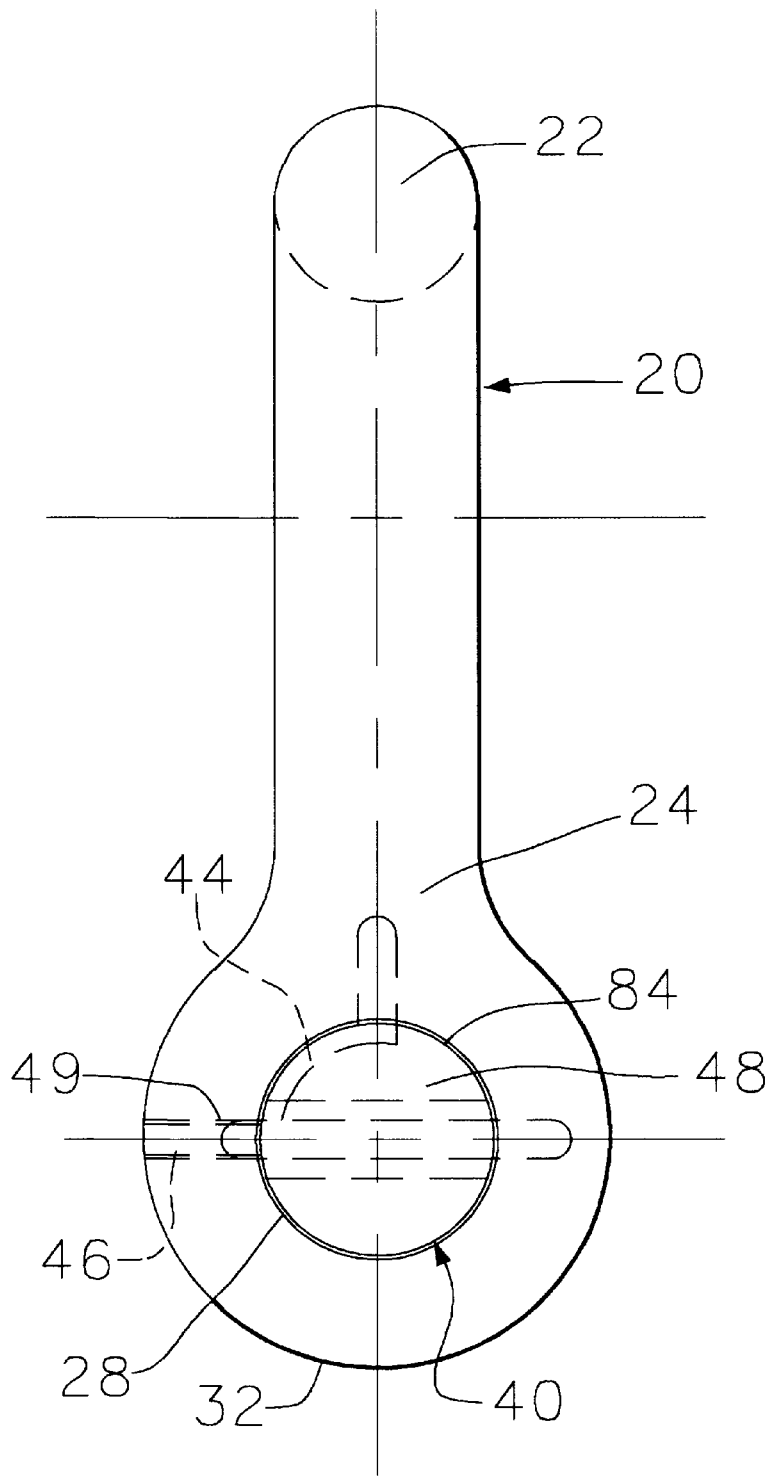
FIG. 4 is an opposite side elevational view from FIG. 2 and illustrates the clevis pin in the passageway in the legs of the shackle.
Figure 5:
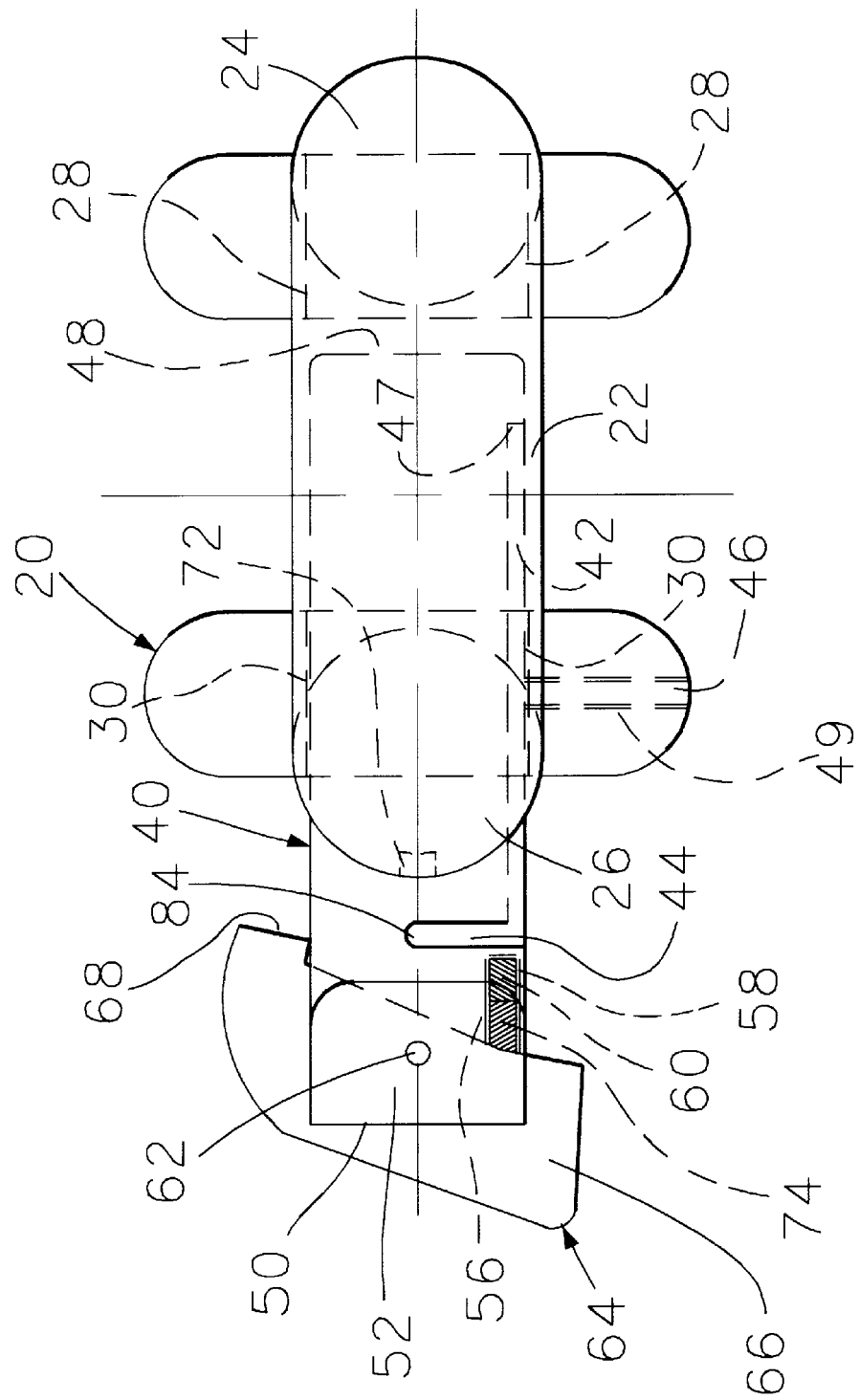
FIG. 5 is a top plan view of the combination of the shackle and the clevis pin and illustrates the combination of the locking lever and spring in the left end of the clevis pin.
Figure 6:
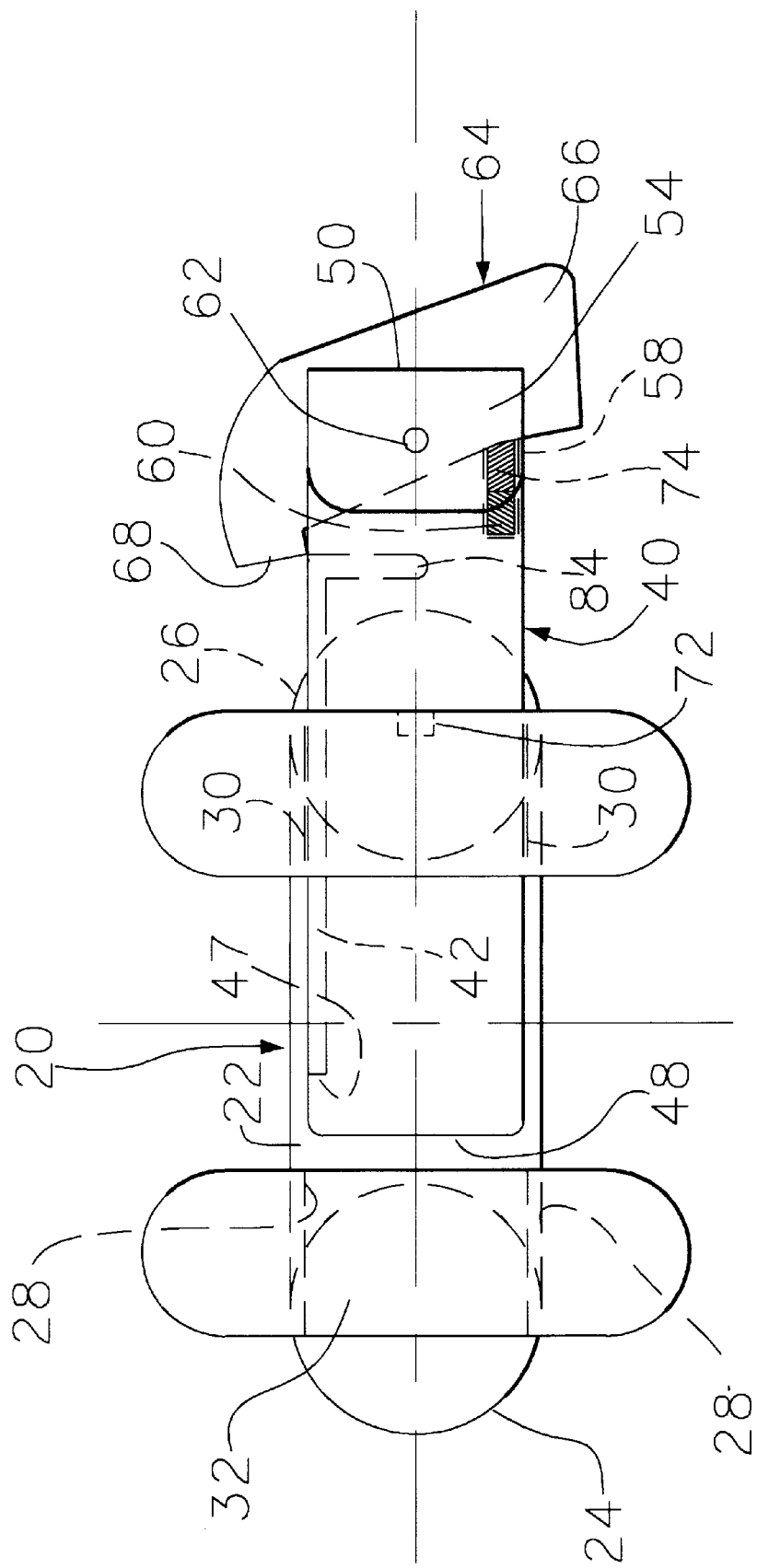
FIG. 6 is a bottom plan view of the shackle and illustrates the clevis pin in a passageway in the shackle and also illustrates the locking lever being urged by a spring to the recess in the exterior surface of the shackle.

In FIG. 7 it is seen that the clevis pin 40 is in the first passageway 28 in the first leg 24 and also in the second passageway 30 in the second leg 26. The dowel pin 46 is in the end of the circumferential groove 44 and may be bearing against the end 84 of the circumferential groove 44. It is desired to remove the clevis pin 40 from the shackle 20. The operator can bear on the lower part of the locking lever 64 so as to rotate the locking lever in a clockwise direction and to remove the projecting finger 68 from the recess 72. Then, the clevis pin 40 can be rotated 90 degrees so that the dowel pin 40 is in both the circumferential groove 44 and the longitudinal groove 42. The clevis pin 40 is moved so that the clevis pin is no longer in the passageway 28 and the end of the clevis pin is in the second passageway 30. The projecting finger 68, with the dowel pin 46 bearing against the end 84 of the circumferential groove 44, is rotated away from the viewer so that the dowel pin 46 is in both the circumferential groove 44 and in the longitudinal groove 42. The clevis pin 40 is moved out of the first passageway 28 in the first leg 24 so that the dowel pin 46 is bearing against the end 47 of the longitudinal groove 42. This restricts the motion of the clevis pin 40 so that the clevis pin cannot be removed from the shackle 20. The end 48 of the clevis pin 40 is in the second passageway in the second leg 26, see FIG. 3. An operator desires to connect a cable 80 with a loop 82 to the clevis pin 40. In FIG. 3 the loop 82 is so positioned that the clevis pin 40 can be moved through the loop 82 and into the first passageway 28 in the first leg 24. The clevis pin is so moved that the dowel pin 46 is in both the longitudinal guide 42 and in the circumferential guide 44. The operator can then rotate the clevis pin 90 degrees so that the dowel pin 46 is in the recess guide 44. The rotation of the clevis pin 40 is such that the recesses 56 and 58 and the spring 60 are rotated away from the viewer of FIG. 3. With the outwardly projecting finger 68 near the recess 72 in the second leg 26, the spring 60 urges the projecting finger 68 into the recess 72.

The clevis 40 and the shackle 20 are now locked together so that they cannot rotate with respect to each other. Also, the clevis pin 40 is locked in the second passageway 30 in the second leg 26 and the clevis pin 40 is also locked in the first passageway 28 in the first leg 24. The cable 76 and the cable 80 are now connected together by means of the shackle 20 and the clevis pin 40.

What I claim is:

1. A shackle comprising:

a. a first leg and second leg joining with each other;

b. a first passageway in said first leg;

c. a second passageway in said second leg;

d. a dowel pin in said second leg and projecting into said second passageway;

e. a clevis pin having an exterior surface;

f. a first groove in said exterior surface and having a length less than the length of said clevis pin;

g. the inner end of said dowel pin being in said first groove to control the movement of said clevis pin with respect to said shackle;

h. said clevis pin being positioned in said second passageway and with said dowel pin in said first groove;

i. said clevis pin may be positioned with respect to said first passageway and said first leg to permit said clevis pin to be in said first passageway and to permit said clevis pin to be out of said first passageway;

j. a first part of a locking means on said clevis pin;

k. a second part of said locking means on said second leg;

l. said first part and said second part in cooperation with each other prevent rotation of said shackle and said clevis pin with respect to each other;

m. diametrical recess in said outer end of said clevis pin;

n. a locking lever in said diametrical recess;

o. a first rotational means operatively connecting with said outer end and with said locking lever to assist in the rotation of said locking lever; and p. said locking lever being said first part of a locking means.

2. A shackle according to claim 1 and comprising;

a. a spring in said diametrical recess and operatively connecting with said locking lever.

3. A shackle according to claim 2 and comprising:

a. said second leg having an exterior surface on said second leg;

b. said second part of said locking means being a first recess in said exterior surface of said second leg; and c. part of said locking lever being in said first recess to preclude said shackle and said clevis pin rotating with respect to each other.

4. A shackle according to claim 3 and comprising:

a. said part of said locking lever being an outwardly projecting finger; and b. said spring urging said outwardly projecting finger into said first recess.

5. A shackle according to claim 4 and comprising:

a. that part of said locking level near said spring having an outwardly projecting guard to preclude extraneous material contacting said spring.

6. A shackle according to claim 1 and comprising:

a. the outer end of said clevis pin tapering inwardly to be of a smaller dimension in the area of said locking lever than the cross-sectional dimension of said clevis pin.

7. A shackle comprising:
a. a first leg and second leg joining with each other;
b. a first passageway in said first leg;
c. a second passageway in said second leg;
d. a dowel pin in said second leg and projecting into said second passageway;
e. a clevis pin having an exterior surface;
f. a first groove in said exterior surface and having a length less than the length of said clevis pin;
g. the inner end of said dowel pin being in said first groove to control the movement of said clevis pin with respect to said shackle;
h. said clevis pin being positioned in said second passageway and with said dowel pin in said first groove;
i. said clevis pin may be positioned with respect to said first passageway and said first leg to permit said clevis pin to be in said first passageway and to permit said clevis pin to be out of said first passageway;
j. a first part of a locking means on said clevis pin;
k. a second part of said locking means on said second leg;
l. said first part and said second part in cooperation with each other prevent rotation of said shackle and said clevis pin with respect to each other;
m. said first groove, with respect to said clevis pin, being a longitudinal groove;
n. a second groove in said clevis pin and near said first part of said locking means;
o. said second groove connecting with said first groove and being a circumferential groove;
p. said second groove being capable of receiving said dowel pin;
q. with said dowel pin in said second groove and with said first part and said second part in cooperation with each other said clevis pin is positioned in said first passageway and is positioned in said second passageway;
r. with said dowel pin in said first groove and away from said second groove said clevis pin is in said second passageway and is not in said first passageway;
s. said first groove and said second groove being substantially at right angles to each other;
t. the second groove extends through an arc of about 90 degrees;
u. said clevis pin having an inner end and an outer end;
v. said inner end may be positioned in said first passageway and may be positioned away from said first passageway;
w. said inner end may be positioned in said second passageway and may be positioned away from said second passageway;
x. said first groove terminating away from said inner end and with said dowel pin in said first groove controlling the movement of said clevis pin and precluding the separation of said shackle and said clevis pin;
y. with said dowel pin in said second groove said clevis pin being restricted to being in said shackle and being precluded from separation from said shackle;
z. diametrical recess in said outer end of said clevis pin;
aa. a locking lever in said diametrical recess;
bb. a first rotational means operatively connecting with said outer end and with said locking lever to assist in the rotation of said locking lever; and
cc. said locking lever being said first part of a locking means.

8. A shackle according to claim 7 and comprising;
a. a spring in said diametrical recess and operatively connecting with said locking lever.

9. A shackle according to claim 8 and comprising:
a. said second leg having an exterior surface on said second leg;
b. said second part of said locking means being a first recess in said exterior surface of said second leg; and
c. part of said locking lever being in said first recess to preclude said shackle and said clevis pin rotating with respect to each other.

10. A shackle according to claim 9 and comprising:
a. said part of said locking lever being an outwardly projecting finger; and
b. said spring urging said outwardly projecting finger into said first recess.

11. A shackle according to claim 10 and comprising:
a. that part of said locking level near said spring having an outwardly projecting guard to preclude extraneous material contacting said spring.

12. A shackle according to claim 10 and comprising:
a. the outer end of said clevis pin tapering inwardly to be of a smaller dimension in the area of said locking lever than the cross-sectional dimension of said clevis pin.

13. A process for making a shackle and comprising:
a. forming a shackle having a first leg and a second leg joining with each other;
b. forming a first passageway in said first leg;
c. forming a second passageway in said second leg;
d. positioning a dowel pin in said second leg and said dowel pin projecting into said second passageway;
e. forming a clevis pin having an exterior surface;
f. forming a first groove in said exterior surface with a length less than the length of said clevis pin;
g. positioning the inner end of said dowel pin in said first groove to control the movement of said clevis pin with respect to said shackle;
h. positioning said clevis pin in said second passageway and with said pin in said first groove;
i. said clevis pin may be positioned with respect to said first passageway and said first leg to permit said clevis pin to be in said first passageway and to permit said clevis pin to be out of said first passageway;
j. positioning a first part of said locking means on said clevis pin;
k. positioning a second part of said locking means on said second leg;
l. said first and said second part cooperating with each other to prevent rotation of said shackle and said clevis pin with respect to each other;
m. forming a diametrical recess in said outer pin of said clevis pin;
n. positioning a locking lever in said diametrical recess;
o. operatively connecting a first rotational means with said outer end and with said locking lever to assist in the rotation of said locking lever; and
p. said locking lever being said first part of a locking means.

14. A process for making a shackle and comprising:
a. forming a shackle having a first leg and a second leg joining with each other;
b. forming a first passageway in said first leg;

c. forming a second passageway in said second leg;
d. positioning a dowel pin in said second leg and said dowel pin projecting into said second passageway;
e. forming a clevis pin having an exterior surface;
f. forming a first groove in said exterior surface with a length less than the length of said clevis pin;
g. positioning the inner end of said dowel pin in said first groove to control the movement of said clevis pin with respect to said shackle;
h. positioning said clevis pin in said second passageway and with said pin in said first groove;
i. said clevis pin may be positioned with respect to said first passageway and said first leg to permit said clevis pin to be in said first passageway and to permit said clevis pin to be out of said first passageway;
j. positioning a first part of said locking means on said clevis pin;
k. positioning a second part of said locking means on said second leg;
l. said first and said second part cooperating with each other to prevent rotation of said shackle and said clevis pin with respect to each other;
m. forming said first groove, with respect to said clevis pin, as a longitudinal groove;
n. forming a second groove, as a circumferential groove, in said clevis pin near said first part of said locking means;
p. connecting said first groove and said second groove;
q. forming said second groove so as to be capable of receiving said dowel pin;
r. with the positioning of said dowel pin in said second groove and operatively connecting said first part and said second part then said clevis pin is positioned in said first passageway and is positioned in said second passageway;
s. positioning said dowel pin in said first groove and away from said second groove then said clevis pin is in said second passageway and is not in said first passageway;
t. forming said first groove and said second groove at substantially right angles to each other;
u. forming said second groove to extend through an arc of about 90 degrees;
v. forming said clevis pin with an inner end and an outer end;
w. positioning said inner end in said first passageway and also positioning said inner end away from said first passageway;
x. positioning said inner end in said second passageway and also positioning said inner end away from said second passageway;
y. terminating said first groove away from said inner end and positioning said dowel pin in said first groove for controlling the movement of said clevis pin and for precluding the separation of said shackle and said clevis pin; and
z. positioning said dowel pin in said second groove to restrict said clevis pin to be in said shackle and to preclude the separation of said shackle and said clevis pin.

15. A shackle made by a process comprising:
a. forming a shackle having a first leg and a second leg joining with each other;
b. forming a first passageway in said first leg;
c. forming a second passageway in said second leg;
d. positioning a dowel pin in said second leg and said dowel pin projecting into said second passageway;
e. forming a clevis pin having an exterior surface;
f. forming a first groove in said exterior surface with a length less than the length of said clevis pin;
g. positioning the inner end of said dowel pin in said first groove to control the movement of said clevis pin with respect to said shackle;
h. positioning said clevis pin in said second passageway and with said pin in said first groove;
i. said clevis pin may be positioned with respect to said first passageway and said first leg to permit said clevis pin to be in said first passageway and to permit said clevis pin to be out of said first passageway;
j. positioning a first part of said locking means on said clevis pin;
k. positioning a second part of said locking means on said second leg;
l. said first and said second part cooperating with each other to prevent rotation of said shackle and said clevis pin with respect to each other;
m. forming a diametrical recess in said outer pin of said clevis pin;
n. positioning a locking lever in said diametrical recess;
o. operatively connecting a first rotational means with said outer end and with said locking lever to assist in the rotation of said locking lever; and
p. said locking lever being said first part of a locking means.

16. A shackle made by a process comprising:
a. forming a shackle having a first leg and a second leg joining with each other;
b. forming a first passageway in said first leg;
c. forming a second passageway in said second leg;
d. positioning a dowel pin in said second leg and said dowel pin projecting into said second passageway;
e. forming a clevis pin having an exterior surface;
f. forming a first groove in said exterior surface with a length less than the length of said clevis pin;
g. positioning the inner end of said dowel pin in said first groove to control the movement of said clevis pin with respect to said shackle;
h. positioning said clevis pin in said second passageway and with said pin in said first groove;
i. said clevis pin may be positioned with respect to said first passageway and said first leg to permit said clevis pin to be in said first passageway and to permit said clevis pin to be out of said first passageway;
j. positioning a first part of said locking means on said clevis pin;
k. positioning a second part of said locking means on said second leg;
l. said first and said second part cooperating with each other to prevent rotation of said shackle and said clevis pin with respect to each other;
m. forming said first groove, with respect to said clevis pin, as a longitudinal groove;
n. forming a second groove, as a circumferential groove, in said clevis pin near said first part of said locking means;
o. connecting said first groove and said second groove;

p. forming said second groove so as to be capable of receiving said dowel pin;

q. with the positioning of said dowel pin in said second groove and operatively connecting said first part and said second part then said clevis pin is positioned in said first passageway and is positioned in said second passageway;

r. positioning said dowel pin in said first groove and away from said second groove then said clevis pin is in said second passageway and is not in said first passageway;

s. forming said first groove and said second groove at substantially right angles to each other;

t. forming said second groove to extend through an arc of about 90 degrees;

u. forming said clevis pin with an inner end and an outer end;

v. positioning said inner end in said first passageway and also positioning said inner end away from said first passageway;

w. positioning said inner end in said second passageway and also positioning said inner end away from said second passageway;

x. terminating said first groove away from said inner end and positioning said dowel pin in said first groove for controlling the movement of said clevis pin and for precluding the separation of said shackle and said clevis pin; and y. positioning said dowel pin in said second groove to restrict said clevis pin to be in said shackle and to preclude the separation of said shackle and said clevis pin.

* * * * *